(12) United States Patent
Shimizu et al.

(10) Patent No.: US 8,094,965 B2
(45) Date of Patent: Jan. 10, 2012

(54) IMAGE PROCESSOR

(75) Inventors: Sota Shimizu, Pasadena, CA (US); Joel W. Burdick, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 1055 days.

(21) Appl. No.: 11/960,581

(22) Filed: Dec. 19, 2007

(65) Prior Publication Data

US 2008/0143857 A1 Jun. 19, 2008

Related U.S. Application Data

(60) Provisional application No. 60/875,731, filed on Dec. 19, 2006, provisional application No. 60/875,740, filed on Dec. 19, 2006.

(51) Int. Cl.
*G06K 9/40* (2006.01)
*G06K 9/32* (2006.01)

(52) U.S. Cl. ......................... 382/275; 382/293
(58) Field of Classification Search .................. None
See application file for complete search history.

(56) References Cited

U.S. PATENT DOCUMENTS

| | | | | |
|---|---|---|---|---|
| 5,047,931 A * | 9/1991 | Lin | ............... | 378/14 |
| 5,063,604 A * | 11/1991 | Weiman | ............... | 382/170 |
| 5,905,814 A * | 5/1999 | Mochizuki et al. | ........... | 382/239 |
| 6,005,984 A * | 12/1999 | Kawakami et al. | ........... | 382/276 |
| 6,252,989 B1 * | 6/2001 | Geisler et al. | ................ | 382/232 |
| 6,466,262 B1 | 10/2002 | Miyatake et al. | | |
| 6,535,617 B1 * | 3/2003 | Hannigan et al. | ............ | 382/100 |
| 6,611,282 B1 | 8/2003 | Trubko et al. | | |
| 6,836,298 B2 | 12/2004 | Song et al. | | |
| 7,058,237 B2 * | 6/2006 | Liu et al. | ....................... | 382/276 |
| 7,679,622 B2 * | 3/2010 | Lee et al. | ....................... | 345/619 |
| 2002/0064314 A1 * | 5/2002 | Comaniciu et al. | ........... | 382/239 |
| 2003/0098954 A1 * | 5/2003 | Amir et al. | .................... | 351/210 |
| 2005/0036707 A1 * | 2/2005 | Matsuura | ..................... | 382/275 |
| 2005/0083482 A1 * | 4/2005 | Miller et al. | ................. | 351/169 |
| 2005/0089213 A1 * | 4/2005 | Geng | ............................ | 382/154 |
| 2006/0050386 A1 * | 3/2006 | Kuthirummal et al. | ....... | 359/471 |
| 2007/0006317 A1 | 1/2007 | Asami et al. | | |
| 2008/0158226 A1 | 7/2008 | Shimizu | | |

FOREIGN PATENT DOCUMENTS

| | | |
|---|---|---|
| JP | 10 188 146 | 7/1998 |
| KR | 2003 0078235 | 10/2003 |
| KR | 2006-0059302 | 6/2006 |
| WO | 97/43854 | 11/1997 |

(Continued)

OTHER PUBLICATIONS

Weiman, "Video Compression Via Log Polar Mapping." SPIE Proceedings: Real Time Image Processing II, 1295-266-277, 1990.*

(Continued)

*Primary Examiner* — Michelle Entezari
(74) *Attorney, Agent, or Firm* — Steinfl & Bruno LLP

(57) ABSTRACT

A system and method for making an image processor. A system for processing an image may include a target image processing element, a distorted image calculating element coupled to the target image processing element, an eccentricity estimator coupled to the distorted image calculating element, an eccentricity compensator coupled to the distorted image calculating element, a distorted foveated image modeler coupled to the eccentricity compensator, a log-polar image generator coupled to the eccentricity compensator, and an unreliable feature omitter coupled to the eccentricity compensator. Methods to make the foregoing system are also described.

21 Claims, 16 Drawing Sheets

FOREIGN PATENT DOCUMENTS

| | | |
|---|---|---|
| WO | 02/078346 | 10/2002 |
| WO | 03/107274 | 12/2003 |
| WO | 2006/062325 | 6/2006 |

OTHER PUBLICATIONS

PCT Search Report for PCT/US2007/088233 filed on Dec. 19, 2007 in the name of California Institute of Technology.
PCT Written Opinion for PCT/US2007/088233 filed on Dec. 19, 2007 in the name of California Institute of Technology.
PCT Search Report for PCT/US2007/088228 filed on Dec. 19, 2007 in the name of California Institute of Technology.
PCT Written Opinion for PCT/US2007/088228 filed on Dec. 19, 2007 in the name of California Institute of Technology.
T. Baron et al, Exploring With a Foveated Robot Eye System, Proc. Of $12^{th}$ International Conference on Pattern Recognition, pp. 377-380, 1994.
A. Baumberg, Reliable Feature Matching Across Widely Separated Views, Proceedings of Computer Vision and Pattern Recognition, vol. 1, pp. 774-781, 2000.
F. Berton et al, Anthropomorphic Visual Sensors, Edited by C.A. Grimes, E.C. Dickey, and M.V. Pishko, vol. 10, pp. 1-16, 2005.
M. Bolduc et al, A Review of Biologically-Motivated Space-Variant Data Reduction Models for Robotic Vision, Computer Vision and Image Understanding, vol. 69, No. 2, pp. 170-184, 1996.
David Casasent et al, Position, Rotation and Scale Invariant Optical Correlation, Applied Optics, vol. 15, No. 7, Jul. 1976.
E.L. Schwatz, Spatial Mapping in the Primate Sensory Projection: Analytic Structure and Relevance to Perception, Biol. Cybernetics 25, 181-194, 1977.
Hiroshi Ishiguro et al, Omni-Directional Stereo for Making Global Map, Proc. IEEE $3^{rd}$ Int. Conf. Computer Vision, 1990.
Yasuo Kuniyoshi et al, A Foveated Wide Angle Lens For Active Vision, Proc. IEEE Intl. Conf. on Robotics and Automation, pp. 2982-2988, May 1995.
Sohta Shimizu et al, Wide-Angle Vision Sensor With High-Distortion Lens, JSME International Journal, Series C, vol. 41, No. 4, 1998.
Sota Shimizu et al, Image Extraction by Wide Angle Foveated Lens for Overt-Attention, Proc. IEEE Intl. Conf. on Robotics and Automation, pp. 3437-3442, May 2006.
Sohta Shimizu et al, Wide Angle Sensor With Fovea (Navigation of Mobile Robot Based on Cooperation between Central Vision and Peripheral Vision), Proc. Of BRES99, pp. 53-56, 1999.
Robert Wodnicki et al, A Foveated Image Sensor in Standard CMOS Technology, In Custom Intergrated Circuits Conference, Santa Clarita, California, May 1995.
S.W. Wilson, On the Retino-Cortical Mapping, Int. J. Man-Machine Studies, vol. 18, pp. 361-389, 1983.
Yusushi Yagi et al, Real-Time Omnidirectional Image Sensor (COPIS) For Vision-Guided Navigation, IEEE Transactions on Robotics and Automation, vol. 10, No. 1, Feb. 1994.
B.S. Reddy et al, An FFT-Based Technique For Translation, Rotation, and Scale-Invariant Image Registration, IEEE Transactions on Image Processing, vol. 5, No. 8, Aug. 1996.
Sohta Shimizu, Multi-Functional Application of Wide-Angle Foveated Vision Sensor in Mobile Robot Navigation, J. of Robotics and Mechatronics, vol. 14, No. 4, 2002.
Sota Shimizu, Machine Vision System to Induct Binocular Wide-Angle Foveated Information Into Both The Human and Computers, Proc. 2005 IEEE Intl. Conf. on Robotics and Automation, Apr. 2005.
Giulio Sandini, An Anthropomorphic Retina-Like Structure For Scene Analysis, Computer Graphics and Image Processing, vol. 14, pp. 365-372, 1980.
Sota Shimizu et al, Vision Sensor With Wide Angle and High Distortion Lens, Video Proc of IEEE Intl. Conf. on Robotics and Automation, Visual Sensing 3, May 1995.
Patrick Stelmaszyk et al, Local Processing As a Cue for Deceasing 3-D Structure Computation, Proc. Roundtable Discussion on Vision-Based Vehicle Guidance '90, 1990.
J. Van der Spiegel, A Foveated Retina-Like Sensor Using CCD Technology, Analog VLSI Implementations of Neural Networks, Boston, MA 1989.
G. Kreider et al, A Retina-Like Space Variant CCD Sensor, No. 1242, pp. 133-140, 1990.
S.J. Oh et al, Guidance of a Mobile Robot Using an Omnidirectional Vision Navigation System, SPIE, vol. 852 Mobile Robots II, 1987.
Non-Final office action issued by the USPTO for U.S. Appl. No. 11/960,607, filed Dec. 19, 2007 in the name of Sota Shimizu mail date: Apr. 18, 2011.
Paneri, F., et al., Space Variant Vision for an Active Camera Mount, Proc. of SPIE 1995, 2488: 284-296.
Shimojo, S., et al., Gaze bias both reflects and influences preference, Nature Neuroscience 2003, 6: 1317-1322.
Tsuji, S., et al., Local Processing as a Cue for Decreasing 3-D Structure Computation, Proc. Roundtable Discussion on Vision-Based Vehicle Guidance 1990, 129-148.
Wolberg, G., et al., Robust Image Registration Using Log-Polar Transform, Proc. of IEEE International Conference on Image Processing 2000, 1: 493-496.
Bernardino, A., et al., Foveated active tracking with redundant 2D motion parameters, Robotics and Autonomous Systems 2002, 39: 205-221.

* cited by examiner (a) when $\theta_\varepsilon = 0[°]$ (b) when $\theta_\varepsilon = 18.69[°]$ (c) when $\theta_\varepsilon = 34.08[°]$ (a)*CLP* of 0% WGN before UFO (b)*CLP* of 0% WGN after UFO by Haar wavelet (c)*CLP* of 0% WGN after UFO by Daubechies (7,9) wavelet (d)*CLP* of 5% WGN before UFO (e)*CLP* of 5% WGN after UFO by Haar wavelet (f)*CLP* of 5% WGN after UFO by Daubechies (7,9) wavelet (g)*CLP* of 10% WGN before UFO (h)*CLP* of 10% WGN after UFO by Haar wavelet (i)*CLP* of 10% WGN after UFO by Daubechies (7,9) wavelet (a) by $f'_{CF}$ when $\varepsilon/\delta$ = 0, 25, and 50 (from the left)

(b) by $f_{CF}$ when $\varepsilon/\delta$ = 0, 25, and 50 (from the left)

(a) when $N_\eta \times N_\xi = 256 \times 128$ (b) when $N_\eta \times N_\xi = 64 \times 32$

IMAGE PROCESSOR

CROSS-REFERENCE TO RELATED APPLICATIONS

This Application claims priority to U.S. Provisional Application No. 60/875,731; filed Dec. 19, 2006, titled "A Model of Eccentricity Compensator for Fovea Sensor"; and No. 60/875,740, filed Dec. 19, 2006, titled "A Model of Rotation-, Scale-, and Transition-invariant Feature Extractor from Space-invariant Image."

INCORPORATION BY REFERENCE

References cited within this application, including patents, published patent applications other publications, and the U.S. Provisional Application Nos. 60/875,731 and 60/875,740; both filed Dec. 19, 2006, are hereby incorporated by reference in their entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND

1. Field

This disclosure is generally related to signal processors and in particular to an optical image processor.

2. Description of Related Art

Log-polar mapping, biologically-inspired by analytic formulation of cortical mapping of the primate visual system, exists as a method that reduces image data size drastically but also gives rotation- and scale-invariant (RS-invariant) property. It translates rotation and scaling into translation in two orthogonal directions. This property is applicable for an active vision system where a camera is motorized for changing its gaze position. That is, such system utilizes a log-polar image for implementing rotation- scale- and translation-invariant (RST-invariant) image matching by regarding control of the camera's gaze position at a target as equivalent with translation. In order to acquire the log-polar image, a special CCD or CMOS log-polar chip, that is, a retina-like fovea sensor exists, where a united size of photosensitive elements increases as going to periphery. This fovea sensor has been incorporated into some active vision systems for the purpose of image matching. As another fovea sensor, a wide-angle foveated lens exists for acquiring the log-polar image by distorting a projected image geometrically.

A specially-made optics, such as a Wide-Angle Foveated (WAF) lens, exists where a projected image is distorted geometrically. It combines the special lens with a commercially available conventional linear-coordinate vision chip, where photosensitive elements are arranged uniformly.

BRIEF SUMMARY

Embodiments of the present disclosure provide a system and method for making a image processor.

Briefly described, in architecture, one embodiment of the system, among others, can be implemented as follows.

A system for processing an image may include a target image processing element, a distorted image calculating element coupled to the target image processing element, an eccentricity estimator coupled to the distorted image calculating element, an eccentricity compensator coupled to the distorted image calculating element, a distorted foveated image modeler coupled to the eccentricity compensator, a log-polar image generator coupled to the eccentricity compensator, and an unreliable feature omitter coupled to the eccentricity compensator.

The present disclosure can also be viewed as providing a method of processing an image. The method may include providing a target image, calculating a distorted image from the target image, estimating an eccentricity between the target image and the distorted image, compensating for the eccentricity between the target image and the distorted image; modeling a distorted foveated image, generating a log-polar image, and omitting an unreliable feature.

Other systems, methods, features, and advantages of the present invention will be, or will become apparent, to a person having ordinary skill in the art upon examination of the following drawings and detailed description. It is intended that all such additional systems, methods, features, and advantages included within this description, be within the scope of the present disclosure, and be protected by the accompanying claims.

BRIEF DESCRIPTION OF THE SEVERAL VIEWS OF THE DRAWINGS

Many aspects of the disclosure can be better understood with reference to the following drawings. Components in the drawings are not necessarily to scale, emphasis instead being placed upon clearly illustrating principles of the present invention. Moreover, in the drawing, like-referenced numerals designate corresponding parts throughout the several views.

DETAILED DESCRIPTION

The present disclosure relates to a system and method for making an image processor.

As a person having an ordinary skill in the art would appreciate, an arrow entering a block or a symbol indicates an input and an arrow leaving a block or a symbol indicates an output. Similarly, connections described below may be of any electromagnetic type, such as electrical, optical, radio-frequency, and magnetic.

The present disclosure describes an image or a signal from which rotation-, scale-, and translation-invariant features are extracted.

I. Eccentricity Compensator

A. Calculation of Wide-Angle Distorted Foveated Image

Figure 1:
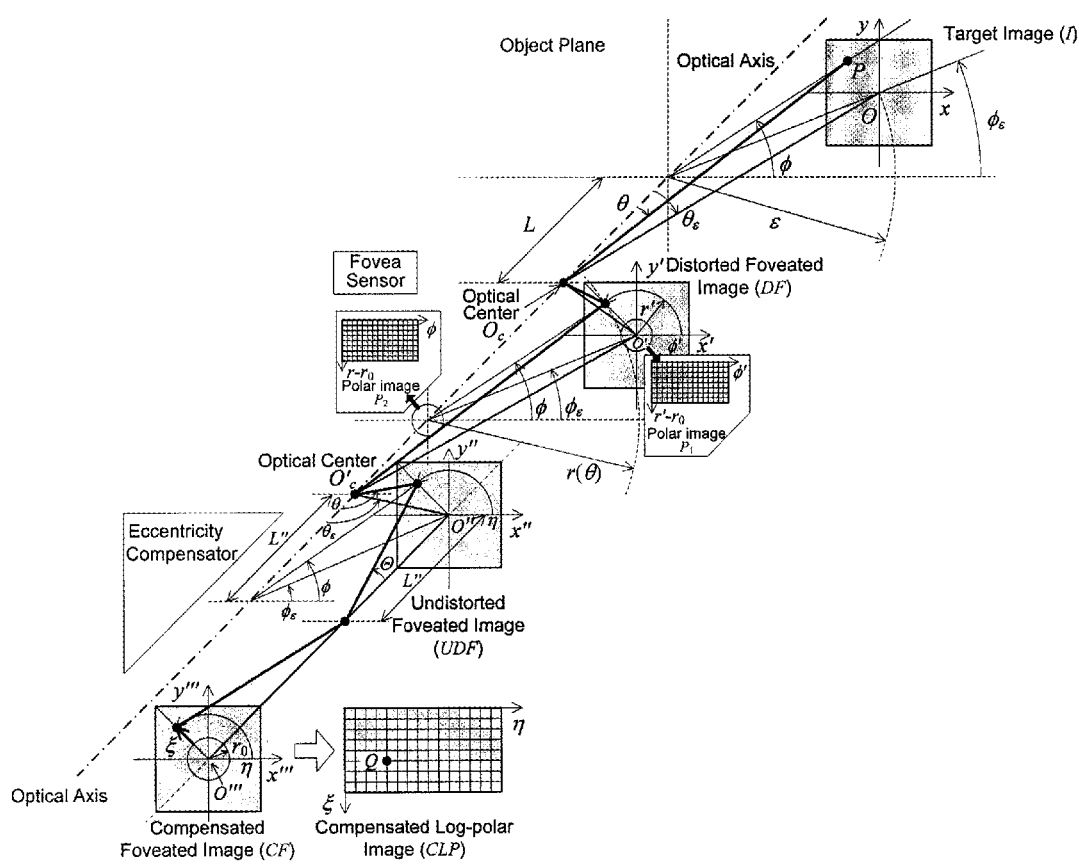
FIG. 1 illustrates a coordinate system of an image related to an embodiment of the present disclosure.

FIG. 1 illustrates a coordinate system of an image related to an embodiment of the present disclosure. A distorted foveated (DF) image is calculated from a target image I. The DF simulates an input image by the fovea sensor. The following definition assumes that the image I is on the object plane with eccentricity $\theta_\epsilon$ in the $\phi_\epsilon$-direction. That is, the $\theta_\epsilon$ is an angle between the optical axis and the straight line from the optical center to the target image center, as shown in FIG. 1. The target image center is the origin of the image I. Discrete coordinates, $(x_d, y_d)$, of the image I are calculated from its continuous coordinates (x,y) using an element size $(\delta_x, \delta_y)$.

$$\begin{cases} x_d = \lfloor x/\delta_x + 0.5 \rfloor \\ y_d = \lfloor y/\delta_y + 0.5 \rfloor \end{cases} \quad (1)$$

A direction, $(\theta, \phi)$, from a point (x, y) to the optical center $O_c$, is represented in Equ. (2).

$$\begin{cases} \theta = \tan^{-1}\left\{\sqrt{(x+\varepsilon\cos\phi_\varepsilon)^2 + (y+\varepsilon\sin\phi_\varepsilon)^2}\,/L\right\} \\ \phi = \tan^{-1}\{(y+\varepsilon\sin\phi_\varepsilon)/(x+\varepsilon\cos\phi_\varepsilon)\} \end{cases} \quad (2)$$

where L is a length from the optical center to the object plane, and $\epsilon$ is positional eccentricity on the object plane.

$$\epsilon = L \tan\theta_\epsilon \quad (3)$$

Continuous coordinates (x', y') of the image DF are represented as $$\begin{cases} x' = \alpha_1(r(\theta)\cos\phi - r(\theta_\varepsilon)\cos(\phi_\varepsilon)) \\ y' = \alpha_1(r(\theta)\sin\phi - r(\theta_\varepsilon)\sin(\phi_\varepsilon)) \end{cases} \quad (4)$$

where $r(\theta)$ shows the image height, determined by the foveation model, versus incident angle $\theta$, $\alpha_1$ is magnification of the image, $(\theta_\epsilon, \phi_\epsilon)$ shows a direction from the target image center to the optical center. Thus, the origin of the coordinates (x', y') corresponds to the direction $(\theta_\epsilon, \phi_\epsilon)$. Discrete coordinates, $(x_d', y_d')$, of the image DF are calculated from the (x', y') by an element size $(\epsilon'_x, \delta'_y)$.

$$\begin{cases} x_d' = \lfloor x'/\delta_x' + 0.5 \rfloor \\ y_d' = \lfloor y'/\delta_y' + 0.5 \rfloor \end{cases} \quad (5)$$

Figure 2:
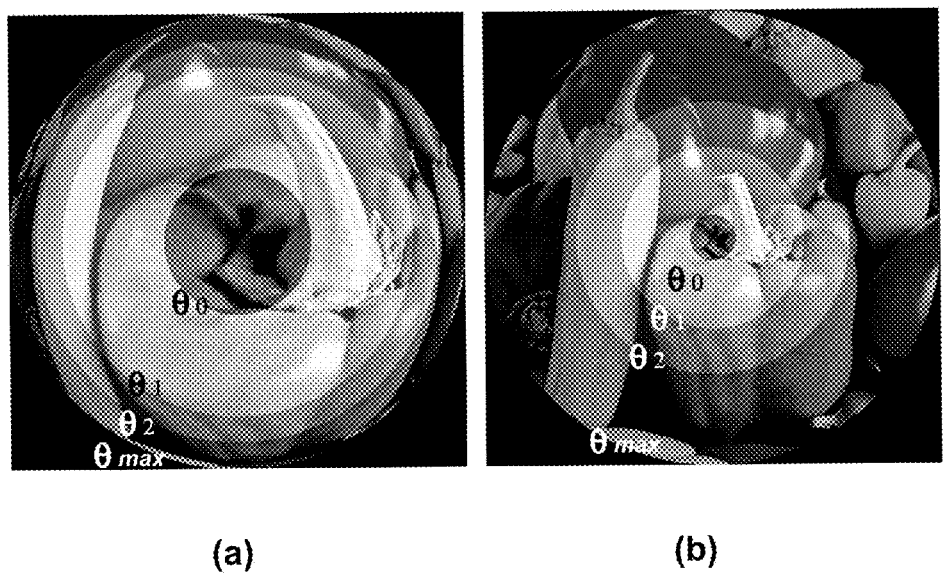
FIG. 2 illustrates an Advanced Wide-Angled Foveated (AdWAF) image and a linear coordinate image.

The present disclosure uses a foveation model, such as an Advanced Wide Angle Foveated (AdWAF) model, in order to calculate the image DF from which a log-polar image can be acquired. The AdWAF model uses both linear coordinates and logarithmic coordinates in both planar projection and spherical projection. The field of view (FOV) is divided into 4 areas, that is, fovea ($0 \leq \theta \leq \theta_0$), para-fovea ($\theta_0 \leq \theta \leq \theta_1$), near-periphery ($\theta_1 \leq \theta \leq \theta_2$), and periphery ($\theta_2 \leq \theta \leq \theta_{max}$). FIG. 2 compares a simulated AdWAF image and a linear-coordinate image by pinhole camera (PHC) lens model. In FIG. 2, the boundaries of FOV, that is, $\theta_0$, $\theta_1$, $\theta_2$ and $\theta_{max}$, are 9.826[°], 19.107[°], 34.715[°], and 60.0[°] respectively. Intensity is changed in order to see each boundary easily. The image height $r(\theta)$ of the AdWAF model is defined in the following.

AdWAF Model:
if $0 \leq \theta \leq \theta_0$, $$r = r_{max} c_0 f_1 \tan\theta, \quad (6)$$

where $f_1$ is a focal length for planar projection,
else if $\theta_0 \leq \theta \leq \theta_1$ (inner bright part in FIG. 2), $$r = r_{max}\{c_1 \log_a f_1 \tan\theta + d_1\}, \quad (7)$$

where a basis $\alpha$ is represented as $\alpha = \exp(1/f_1 \tan\theta_0)$,
else if $\theta_1 \leq \theta \leq \theta_2$, $$r = r_{max}\{c_2 \log_b(f_2\theta) + d_2\}, \quad (8)$$

where $f_2$ is a focal length for spherical projection, and a basis b is represented as $b = \exp(1/f_2\theta_2)$,
else if $\theta_2 \leq \theta \leq \theta_{max}$, $$r = r_{max}\{c_3 f_2 \theta + d_3\}, \quad (9)$$

where $r_{max}$ is the maximum image height when $\theta = \theta_{max}$, $c_i$ (i=0, 1, 2, 3) is a scale modification factor for adjusting the height, and $d_i$ (i=1, 2, 3) is calculated by continuity of the image height and its magnification.

PHC Lens:

$$r = \frac{r_{max} c_0}{\tan\theta_{max}}\tan\theta \quad (0 \leq \theta \leq \theta_{max}). \quad (10)$$

$$L = \frac{r_{max}}{\tan\theta_{max}}. \quad (11)$$

Figure 3:
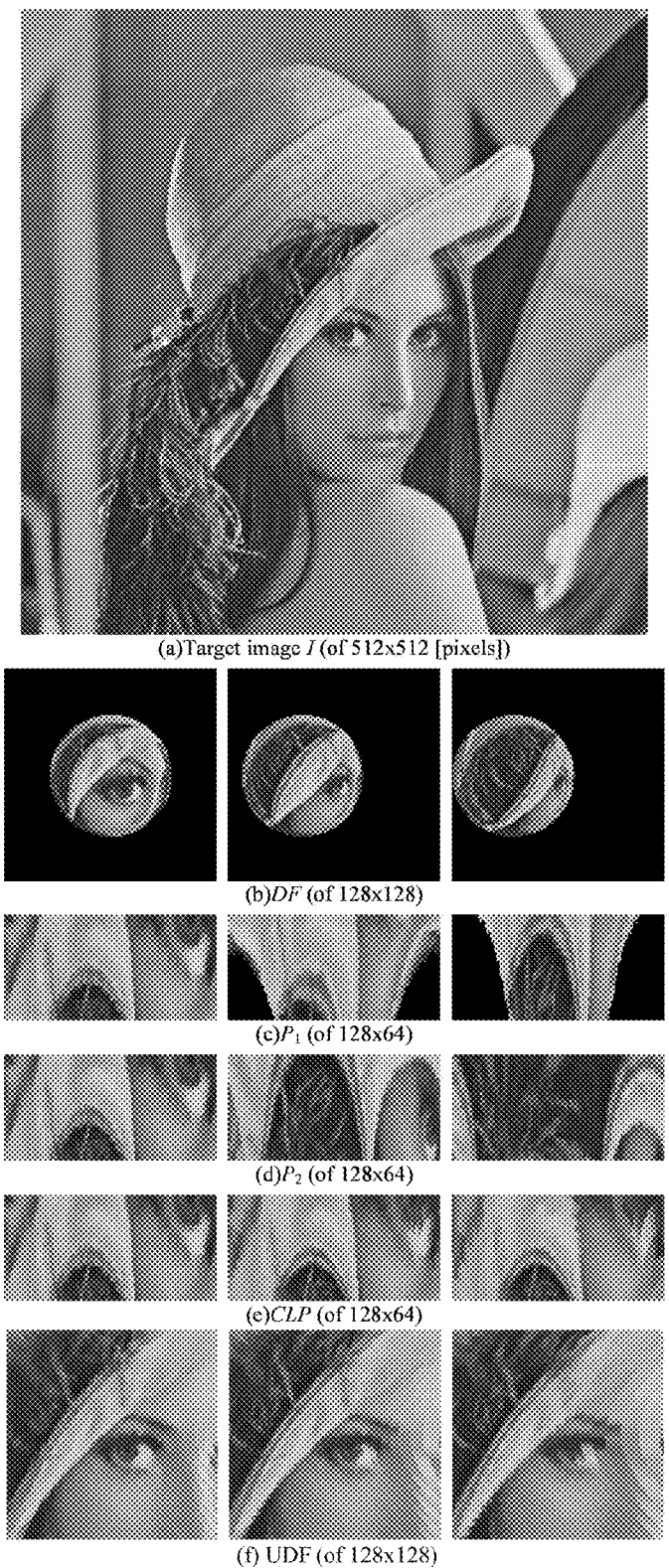
FIG. 3($a$-$f$) illustrates a Target image (I) in part (a), distorted foveated image (DF) in part (b), polar images $P_1$ in part (c) and $P_2$ in part (d), compensated log-polar image (CLP) in part (e), and undistorted foveated image (UDF) in part (f), in each eccentricity $\theta_\epsilon$=0[°], 18.69[°], and 34.08[°] from the left.

B. Modeling Compensated Log-polar Image:

As shown in FIG. 3, the image DF is highly distorted. Continuous coordinates, (x", y"), of the undistorted foveated image UDF (that is, with linear coordinates) are calculated by Equ. (12). The origin of the (x", y") corresponds to that of the image I.

$$\begin{cases} x'' = \alpha_2(L\tan\theta\cos\phi - \varepsilon\cos\phi_\varepsilon) \\ y'' = \alpha_2(L\tan\theta\sin\phi - \varepsilon\sin\phi_\varepsilon) \end{cases} \quad (12)$$

where $\alpha_2$ is magnification. Discrete coordinates $(x_d'', y_d'')$ of the image UDF are calculated from the $(x'', y'')$ by an element size $(\delta_x'', \delta_y'')$, $$\begin{cases} x_d'' = \lfloor x''/\delta_x'' + 0.5 \rfloor \\ y_d'' = \lfloor y''/\delta_y'' + 0.5 \rfloor \end{cases} \tag{13}$$

where $(\delta_x'', \delta_y'')$ is an element size of this image.

Continuous coordinates, $(\eta, \xi)$, of the compensated log-polar image CLP (that is, a remapped log-polar image after correcting the deformation caused by the eccentricity) are calculated from the coordinates $(x'', y'')$ as in Equ. (14).

$$\begin{cases} \eta = \tan^{-1}(y''/x'') \\ \xi = \alpha_3(r(\Theta) - r_0) \end{cases} (\theta_0 \leq \Theta \leq \theta_1), \tag{14}$$

where $r_0$ is a radius from which the log-polar image starts, $\alpha_3$ is magnification of the image, and $\Theta$ is defined as $$\Theta = \tan^{-1}\left(\frac{\sqrt{x''^2 + y''^2}}{L''}\right), \tag{15}$$

where $L'' = \alpha_2 L$. Discrete coordinates $(\eta_d, \xi_d)$ of the image CLP are $$\begin{cases} \eta_d = \lfloor \eta/\delta_\eta + 0.5 \rfloor \\ \xi_d = \lfloor \xi/\delta_\xi + 0.5 \rfloor \end{cases} (\theta_0 \leq \Theta \leq \theta_1), \tag{16}$$

where $(\delta_\eta, \delta_\xi)$ is an element size of this polar image, and the maximum integer of $\eta_d$ is replaced with 0 (that is, the discrete value $\eta_d$ corresponds to $0 \leq \eta < 2\pi$).

Cartesian coordinates, $(x''', y''')$, of the compensated foveated image CF are represented as $$\begin{cases} x''' = \alpha_4 r(\Theta) \cos\eta \\ y''' = \alpha_4 r(\Theta) \sin\eta, \end{cases} \tag{17}$$

where $\alpha_4$ is magnification of the image. Discrete coordinates of the image CF are $$\begin{cases} x_d''' = \lfloor x'''/\delta_x''' + 0.5 \rfloor \\ y_d''' = \lfloor y'''/\delta_y''' + 0.5 \rfloor, \end{cases} \tag{18}$$

where $(\delta_x''', \delta_y''')$ is an element size of this image.

C. Image Simulator in Discrete Space:

In discrete space, image simulator of the proposed compensator outputs the image CLP using the following 2 mappings f and $f_{CLP}$.

$$f : I \to DF, \tag{19}$$

$$DF(x_d', y_d') = \begin{cases} 0, & \text{if } N = 0 \\ \dfrac{1}{N} \sum_{i \in S} I(x_{d\,i}, y_{d\,i}), & \text{if } N \geq 1, \end{cases}$$

where N is the number of members in a set S, and coordinates $(x_d', y_d')$ are calculated from the corresponding coordinates $(x_{d\,i}, y_{d\,i})$ $\{i \in S | (x_d' \leq x_{di}' \leq x_d'+1) \cap (y_d' \leq y_{di}' \leq y_d'+1)\}$ using Equs. (1)-(5). Note that the N is not constant in each coordinates $(x_d', y_d')$.

$$f_{CLP} : DF \to CLP, \tag{20}$$

$$CLP(\eta_d, \xi_d) = \begin{cases} 0, & \text{if } N_{CLP} = 0 \\ \dfrac{1}{N_{CLP}} \sum_{i \in S_{CLP}} DF(x_{d\,i}', y_{d\,i}'), & \text{if } N_{CLP} \geq 1, \end{cases}$$

where $N_{CLP}$ is the number of members in a set $S_{CLP}$, and $(\eta_d, \xi_d)$ are calculated from the corresponding coordinates $(x_{di}', y_{di}')\{i \in S_{CLP} | (\eta_d \leq \eta_{di} \leq \eta_d+1) \cap (\xi_d \leq \xi_{di} \leq \xi_d+1)\}$.

The mapping f is foveation and the $f_{CLP}$ is a kind of cortical mapping. It is noted that the proposed image simulator also calculates intensity of each point from corresponding N-multiple points.

D. Estimation:

For the following simulation, a boundary between fovea and para-fovea is defined by $r_0 = r_{max} c_1 f_1 \tan \theta_0$ using the AdWAF model. FIG. 3(a) shows a target image I of 512×512 [pixels], and FIG. 3(b) shows the distorted foveated image DF of 128×128 [pixels], simulated from the image I using mapping f when $r_{max} = 36$ [pixels] in the AdWAF model in three cases of eccentricity, $\theta_\epsilon = 0[°]$, $18.69[°]$, and $34.08[°]$ (under conditions of $\delta = \delta_x = \delta_y$, and $\phi_\epsilon = 0$). In order to test the compensator, two types of polar images $P_1$ and $P_2$ of 128×64 [pixels] in FIGS. 3(c) and (d), respectively, are used for comparison. The $P_1$ has polar coordinates $(r', \phi')$ around the origin of the image DF. The image $P_2$ has polar coordinates $(r(\theta), \phi)$, on the image DF, around the optical axis of the fovea sensor. FIG. 3(e) shows the compensated log-polar image CLP of 128×64 [pixels] that corresponds to the para-fovea by Equ. (7), when $\theta_1 = 9.826$ [°] and $\theta_2 = 19.107$ [°]. The compensator corrects deformation of the log-polar image in each eccentricity $\theta_\epsilon$, although the resolution of the image CLP distributes radial-asymmetrically. It should be noted that this comparison supposes a practical use of the fovea sensor such as a fovea lens and a log-polar chip. Especially, the case of the image $P_2$ indicates error of gaze position in an active manner. In order to understand the work of the compensator better, the undistorted foveated image UDF is also shown in FIG. 3(f). Note a resolution of the UDF image does not only decreases as going to the eccentricity gets larger but also it is space-variant.

Figure 4:
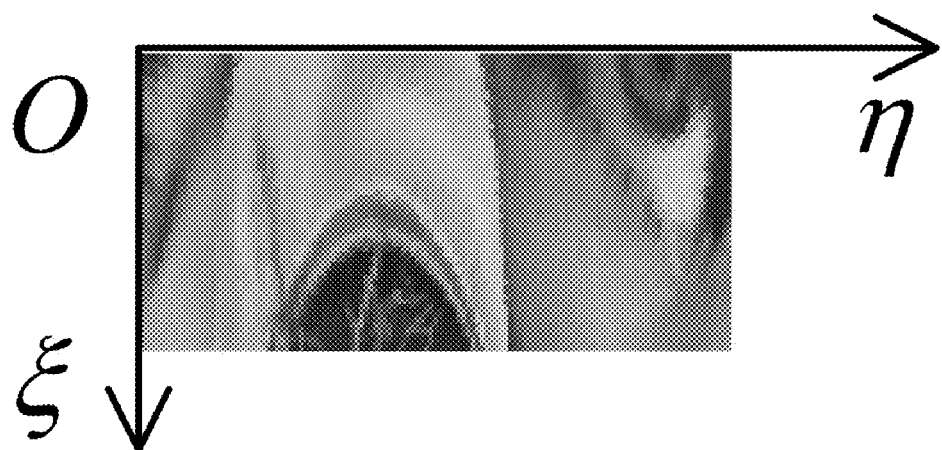
FIG. 4 illustrates a model log-polar image LP and coordinates of the log-polar image.

The image CLP is estimated using root mean square error (RMSE) from a model log-polar image LP, acquired from the image I (FIG. 4). The RMSE E is represented by $$E = \sqrt{\frac{\|CLP - LP\|^2}{N_\eta \cdot N_\xi}}, \tag{21}$$

where $N_\eta$ and $N_\xi$ show the size of the log-polar image.

Figure 5:
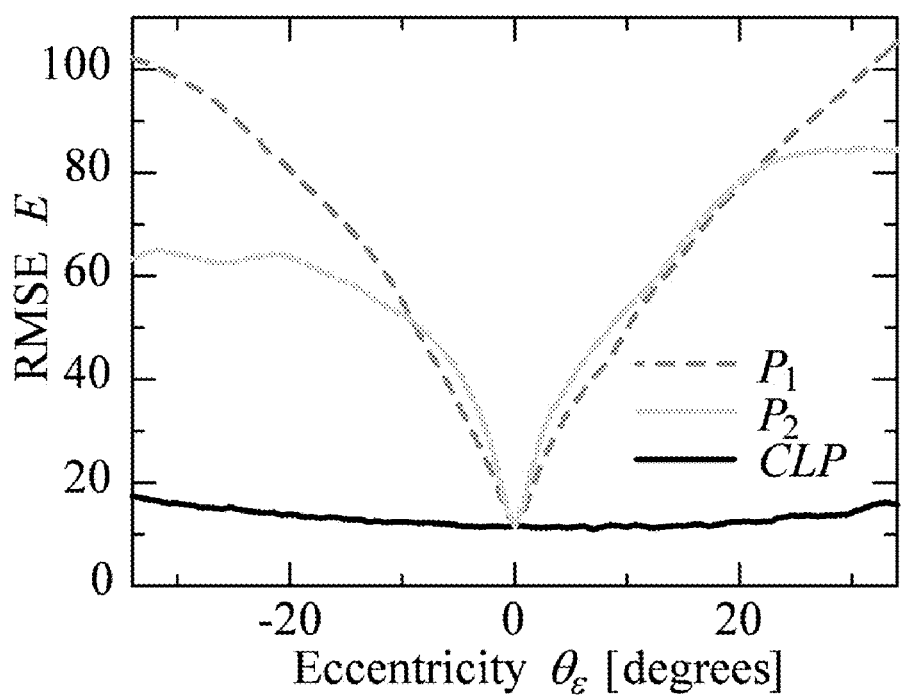
FIG. 5 illustrates a comparison of a Root Mean Squared Error (RMSE) E among $P_1$, $P_2$ and CLP versus $\theta_\epsilon$.

FIG. 5 shows a comparison of RMSE among the polar images $P_1$ (broken line), $P_2$ (dashed line) and the image CLP (solid line) versus the eccentricity $\theta_\epsilon$, when $\phi_\epsilon = 0$. The RMSE of the image CLP is smaller in all incident angles than those of the images $P_1$ and $P_2$, and it increases gradually. This means that the compensator corrects the deformation well compared to the images $P_1$ and $P_2$. However, because intensity of more pixels in the image CLP is determined from the low-resolution part (such as the periphery of the image DF), the RMSE increases, as the eccentricity gets larger. The RMSE of the image CLP changes by up to 2.54[%], in condition of the eccentricity within 34.08[°].

Figure 6:
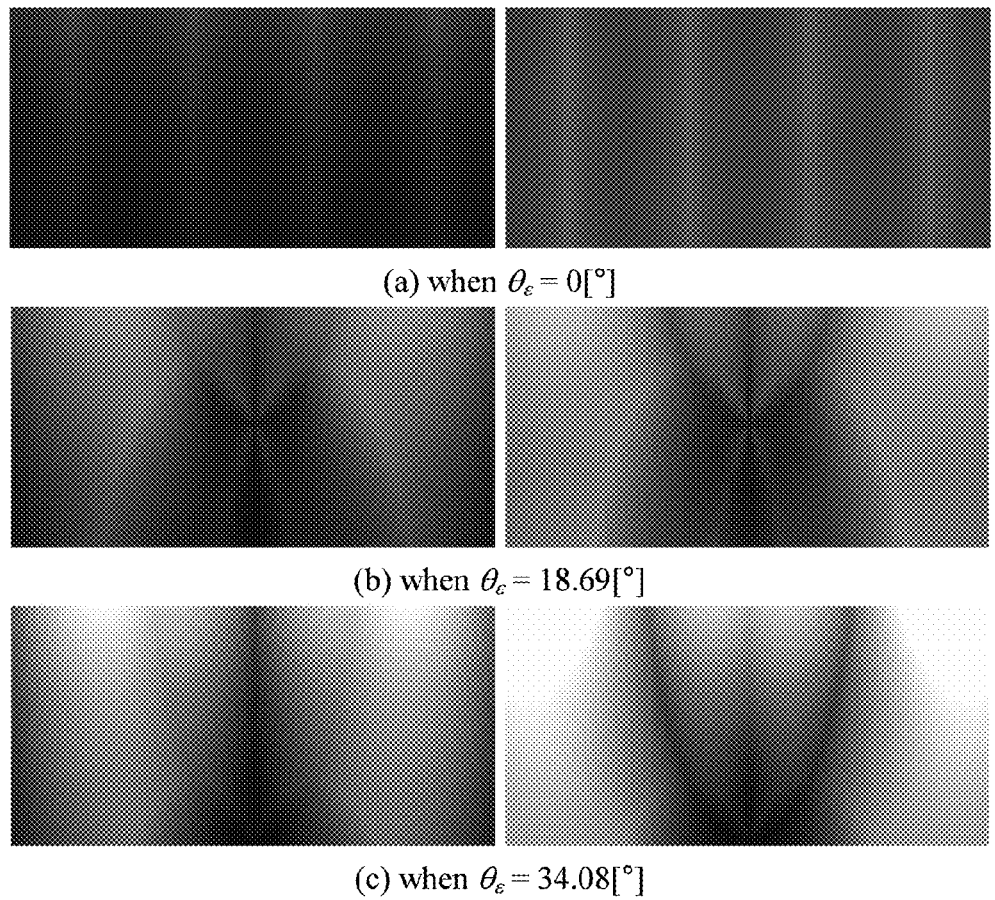
FIG. 6 illustrates a distribution of digitized errors, $\Delta_\eta$ (left) and $\Delta\xi$, (right) of the image CLP.

The log-polar image acquired from a uniform-resolution image such as the image I is space-variant inherently, however, its resolution changes radial-symmetrically (that is, it does not change in the η-direction but changes only in the ξ-direction). When a low-pass filter is used for such space-variant image in order to reduce noise, not only noise but desirable information is also lost from the original image. In addition, if the eccentricity exists, resolution of the image CLP is not only space-variant but also radial-asymmetrical. FIG. 6 shows distribution of digitized errors, Δη and Δξ, of the image CLP, that means resolution in the η-direction and the ξ-direction, when $\theta_\epsilon$=0[°], 18.69[°], and 34.08[°] (when $\phi_\epsilon$=0). The errors Δη and Δξ are calculated from Δθ and Δφ, that is, digitized errors of the image DF in the radial and tangential directions, respectively. They are defined as $$\begin{cases} \Delta\eta = \left|\frac{\partial\eta}{\partial\theta}\right|\cdot\Delta\theta + \left|\frac{\partial\eta}{\partial\phi}\right|\cdot\Delta\phi \\ \Delta\xi = \left|\frac{\partial\xi}{\partial\theta}\right|\cdot\Delta\theta + \left|\frac{\partial\xi}{\partial\phi}\right|\cdot\Delta\phi. \end{cases} \quad (22)$$

II. Unreliable Feature Omission:
A. Definition:

An Unreliable Feature Omission (UFO) is described below. If the image CLP is up-sampled from low-resolution part of the image DF (not fulfilling the sampling theorem), aliasing occurs as noise. This noise appears in components more than some frequency. The UFO discards such components using Discrete Wavelet Transform (DWT), because it is suitable for local noise reduction from the space-variant image. UFO is applicable for the radial-asymmetric space-variant resolution caused by the eccentricity, mentioned in the previous chapter. UFO is defined as follows:

1) Define DWT of the image CLP as ω. Its coefficient is represented as $\omega_{j\,k,i}^{c}$, where j is resolution level and c shows diagonal, horizontal and vertical components as d, h, and v, respectively.

2) If points in the image, corresponding to each coefficient $\omega_{j\,k,i}^{c}$, fulfill conditions H^Ξ, H and Ξ in each case of c=d, h and v, respectively, discard the coefficient (set it as zero) as to determine a matrix v of wavelet coefficients.

$$H: \Delta\eta\left(\frac{k\cdot N_\eta}{2^{j-1}}+m, \frac{2l\cdot N_\xi}{2^{j-1}}+n\right) > \frac{4\pi M_f}{2^{j-1}} \quad (23)$$

$$\Xi: \Delta\xi\left(\frac{k\cdot N_\eta}{2^{j-1}}+m, \frac{2l\cdot N_\xi}{2^{j-1}}+n\right) > \frac{4N_\xi\cdot M_f}{2^{j-1}},$$

where $M_f$ is a parameter regulating accuracy of the digitized error in sub-pixel order. The m and n are integer determined by the resolution level j.

3) Define an image U by Invert Discrete Wavelet Transform (IDWT) of the v.

Figure 7:
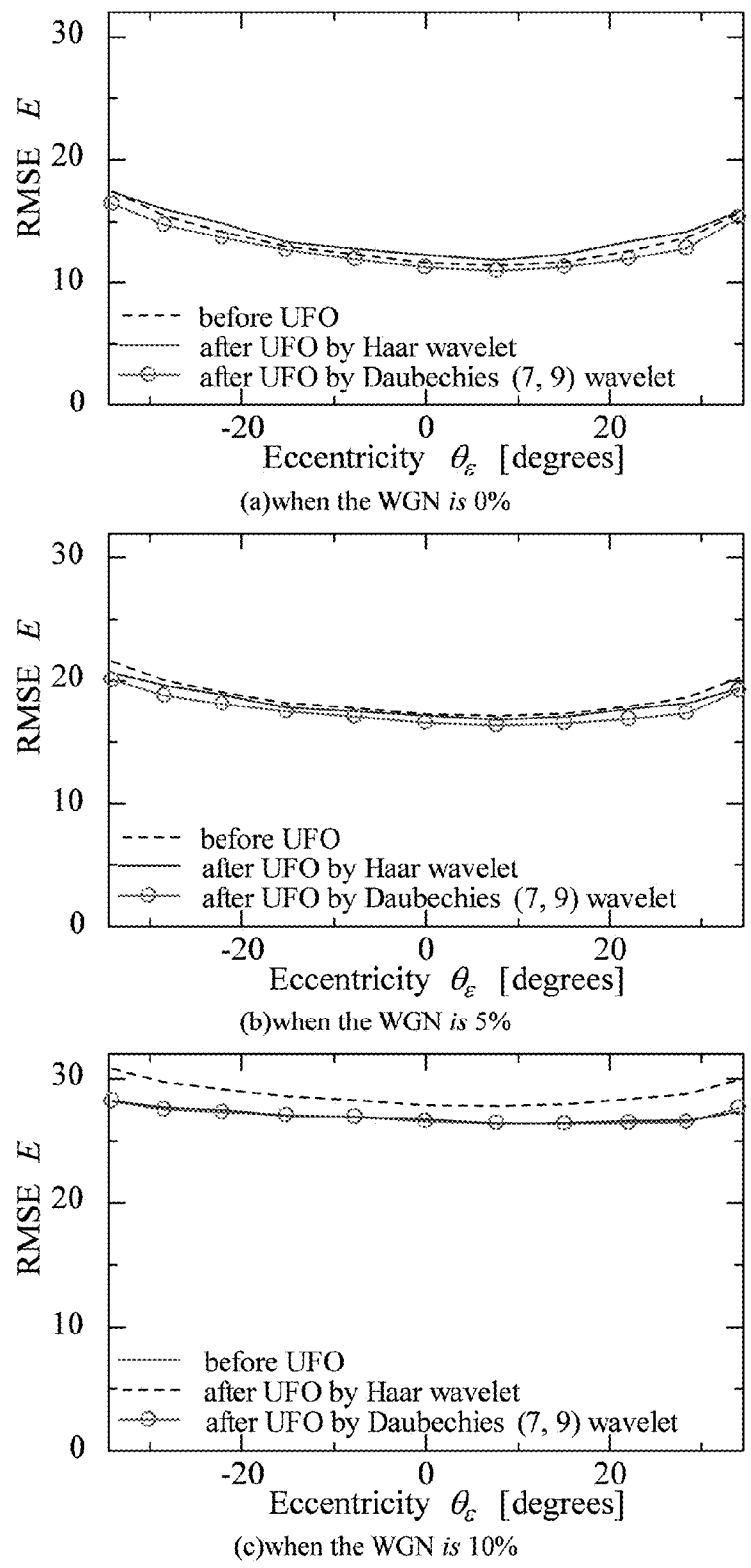
FIG. 7 illustrates an RMSE before and after unreliable feature omission (UFO) in a presence of white Gaussian noise (WGN).
Figure 8:
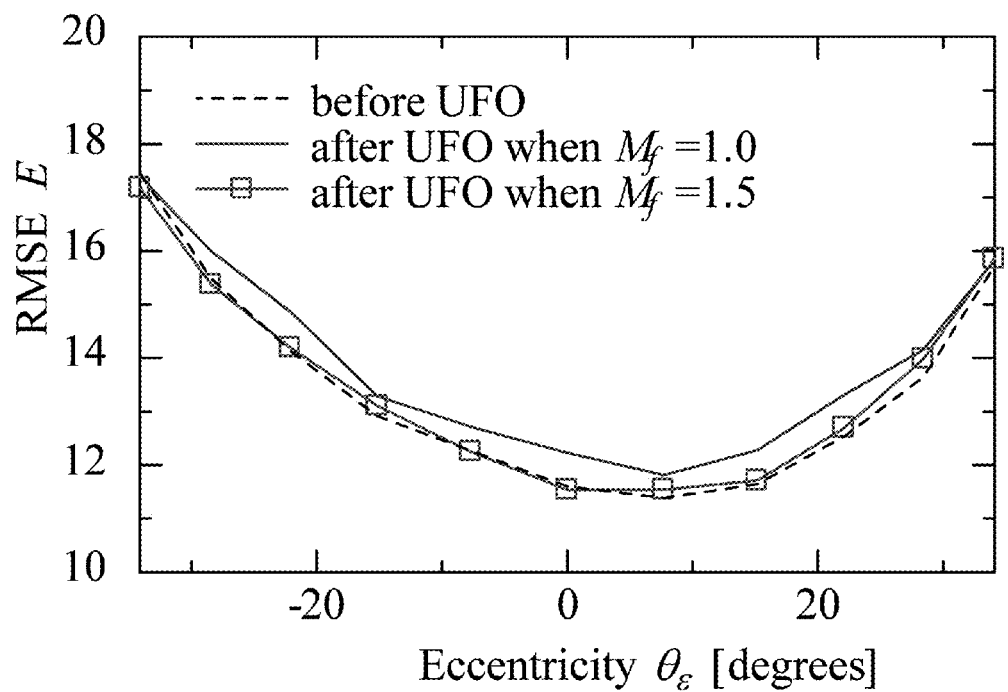
FIG. 8 illustrates an RMSE when a regulating parameter $M_f$ is changed.

B. Estimation:

The image CLP is represented as DF+e1 →$^{f_{CLP}}$ CLP when white Gaussian noise (WGN) e is added to the image DF. FIG. 7 shows the RMSE of the image before UFO (by a broken line), the image U after UFO (by Haar wavelet by a solid line) and the image U after UFO by Daubechies (7, 9) biorthogonal wavelet (by a solid line with circle) versus the eccentricity $\theta_\epsilon$ (when $\phi_\epsilon$=0) (The RMSE is calculated from the image LP). This simulation uses condition of $N_\eta$=2$N_\xi$=128, and $M_f$=1.0.

FIGS. 7(a), (b) and (c) show cases when the WGN is 0[%], 5[%] and 10[%], respectively. The RMSE is calculated by an average of 100 times repetition. The result shows that UFO by Daubechies (7,9) wavelet reduces the RMSE. Even in the case without the WGN, it reduces the RMSE by up to 0.40[%], under a condition of the eccentricity within 34.08[°]. This result means UFO works well for separating the original signal and noise locally based on inherent resolution of the space-variant image. UFO reduces the RMSE more as the WGN gets larger. This may be a desirable property of UFO.

Figure 9:
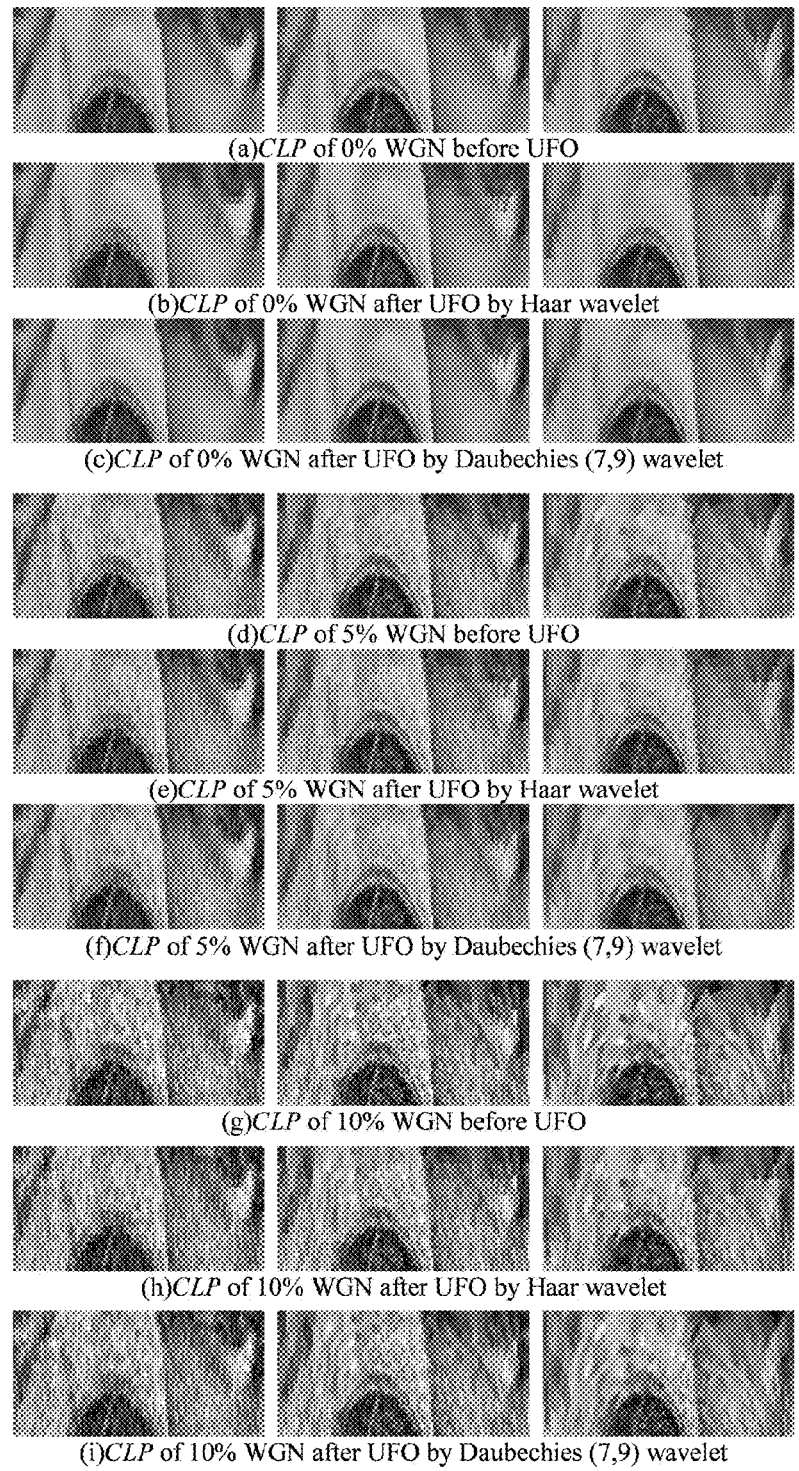
FIGS. 9($a$-$i$) illustrate CLP images before and after UFO when $\theta_\epsilon$=0[°], 18.69[°], and 34.08[°] from the left.

In the case of Haar wavelet, however, when the WGN is 0[%], the RMSE after UFO is slightly larger than that that before UFO. This means that the high level coefficients, removed by UFO, include not only noise but also a part of the original signal. There may be two possible reasons as follows. One is that the distribution of the errors Δη and Δξ is not approximated sufficiently using only dyadic pyramid. The other is that actual errors of Δη and Δξ are smaller than estimated errors (by Equ. (22)), because the image CLP uses a sort of moving average when it is remapped from the image DF as defined in Equ. (20). FIG. 9 shows the RMSE when the regulating parameter $M_f$ changes from 1.0 to 1.5. The RMSE when $M_f$=1.5 gets much closer to that before UFO than that when $M_f$=1.0, although it is not smaller than that before UFO. This result is in line with the possibilities enumerated above.

Figure 10:
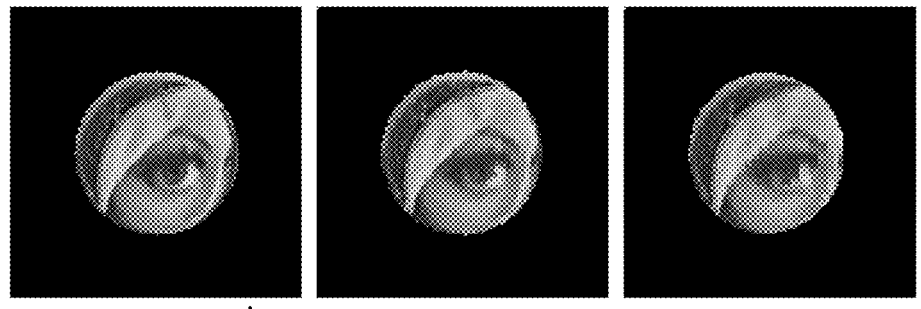
FIGS. 10($a$-$b$) illustrate CF images under an $f_{CF}$ mapping.
Figure 10:
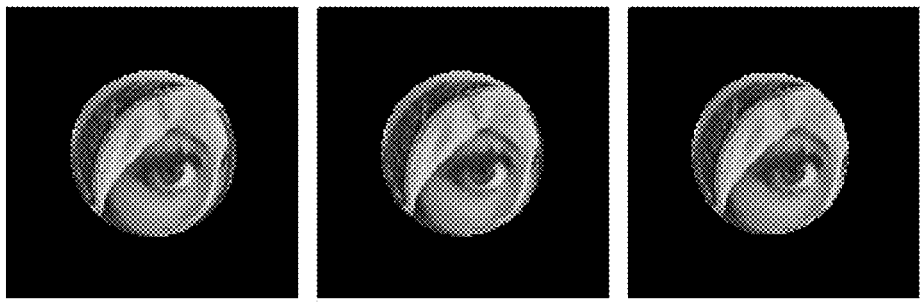

A combination of fovea sensor and compensator is described as follows. By taking account of combining the fovea sensor and the eccentricity compensator, a mapping $f'_{CF}$ from the image DF to the compensated foveated image CF and a mapping $f_{CF}$ from the image I to the image CF are defined as below:

$$f'_{CF}: DF \to CF, \quad (24)$$

$$CF(x_d''', y_d''') = \begin{cases} 0, & \text{if } N'_{CF} = 0 \\ \frac{1}{N'_{CF}}\sum_{i\in S'_{CF}} DF(x'_{d\,i}, y'_{d\,i}), & \text{if } N'_{CF} \geq 1, \end{cases}$$

where $N_{CF}$ is the number of members in a set $S'_{CF}$, and ($x'''_d$, $y'''_d$) are calculated from the corresponding coordinates ($x'_{d\,i}$, $y'_{d\,i}$) $\{i\in S'_{CF}|(x'_d\leq x'_{d\,i}\leq x'_d+1)\cap(y'_d\leq y'_{d\,i}\leq y'_d+1)\}$.

$$f_{CF}: I \to CF, \quad (25)$$

$$CF(x_d''', y_d''') = \begin{cases} 0, & \text{if } N_{CF} = 0 \\ \frac{1}{N_{CF}}\sum_{i\in S_{CF}} I(x_{d\,i}, y_{d\,i}), & \text{if } N_{CF} \geq 1, \end{cases}$$

where $N_{CF}$ is the number of members in a set $S_{CF}$, and ($x'''_d$, $y'''_d$) are calculated from the corresponding coordinates $(x_{di}, y_{di})\{i\in S_{CF}|(x_d\leq x_{d\,i}\leq x_d+1)\cap(y_d\leq y_{d\,i}\leq y_d+1)\}$ FIG. 10 compares these 2 mappings by changing the eccentricity $\theta_\epsilon$ (=0, 18.69 and 34.08[°]) when $\phi_\epsilon$=0. The CF by the mapping $f'_{CF}$ has radial-asymmetrical space-variant resolution. On the other hand, the mapping $f_{CF}$ gives us almost the same look in all cases of eccentricity, although a right-side boundary line changes slightly (because this simulation assumes the fovea sensor has a fixed 120-degree field of view). It should be noted that the mapping $f_{CF}$ is a specific case when the image CF is acquired directly from an undistorted wide-angle image. Thus, the mapping $f_{CF}$ is equivalent with the foveation after translation. This comparison of these two mappings indicates how the compensator should be combined with the fovea sensor in order to acquire a more robust RST-invariant feature.

III. Eccentricity Estimator:

A. Estimating Eccentricity from Distorted Foveated image:

Eccentricity Estimator (EE) estimates the eccentricity $\theta_\epsilon$, from the image DF using a method by which rotation-, scale- and translation-invariant (RST-invariant) features are processed. Fourier-Mellin Transform (FMT) is well-known for extracting such a feature from a linear-coordinate image, that is, a Cartesian image. FMT is based on Fourier Transform (FT) theory. It is equivalent with FT of log-polar mapping (with RS-invariant property) from magnitude of FT (with translation-invariant property) of an image.

When FMT is applied to the image DF, its image distortion needs to be removed. FIG. 3(f) shows an undistorted foveated image UDF with Cartesian coordinates of 128×128 [pixels] in each eccentricity. The image UDF is calculated from the image DF by removing distortion (by Equ. (12) and Equ. (13)).

The discrete image UDF are simulated by a mappings $f_{UDF}$ as follows:

$$f_{UDF}: DF \to UDF, \qquad (26)$$

$$UDF(x''_d, y''_d) = \begin{cases} 0, & \text{if } N_{UDF} = 0 \\ \dfrac{1}{N_{UDF}} \displaystyle\sum_{i \in S_{UDF}} DF(x'_{di}, y'_{di}), & \text{if } N_{UDF} \geq 1, \end{cases}$$

where N is the number of members in a set $S_{UDF}$, and ($x''_d$, $y''_d$) are calculated from the corresponding coordinates $$(x'_{di}, y'_{di}) \; \{i \in S_{UDF} | (x''_d \leq x''_{di} \leq x''_d+1) \cap (y''_d \leq y''_{di} \leq y''_d+1)\}.$$

B. Applying FMT to UDF

The image DF is a space-variant image, that is, distorted. Thus, watermark-like alias is seen in the image UDF of FIG. 3(f) when the distortion is removed. It gets more remarkable as the eccentricity gets larger. Such aliasing occurs when the image is up-sampled from lower resolution (e.g., peripheral FOV of the image DF) to high-resolution (high-density space of the image UDF).

Figure 11:
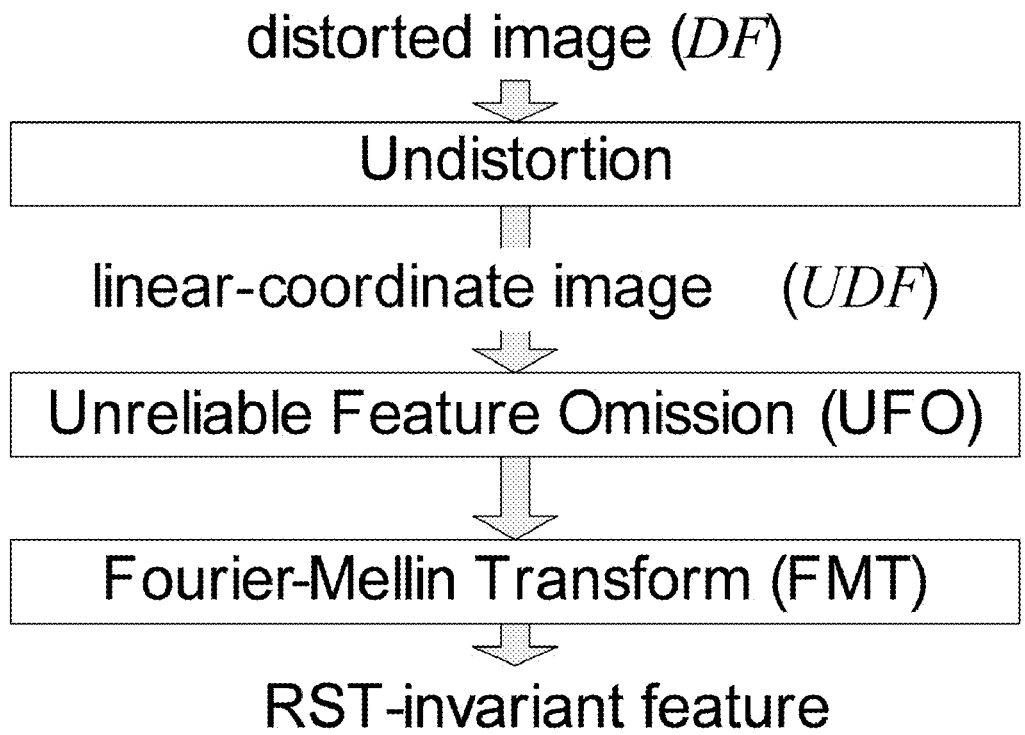
FIG. 11 illustrates a flowchart for an RST-invariant feature acquisition from a space-variant image.

FIG. 11 shows a flowchart for RST-invariant feature acquisition from the image DF.

Figure 12:
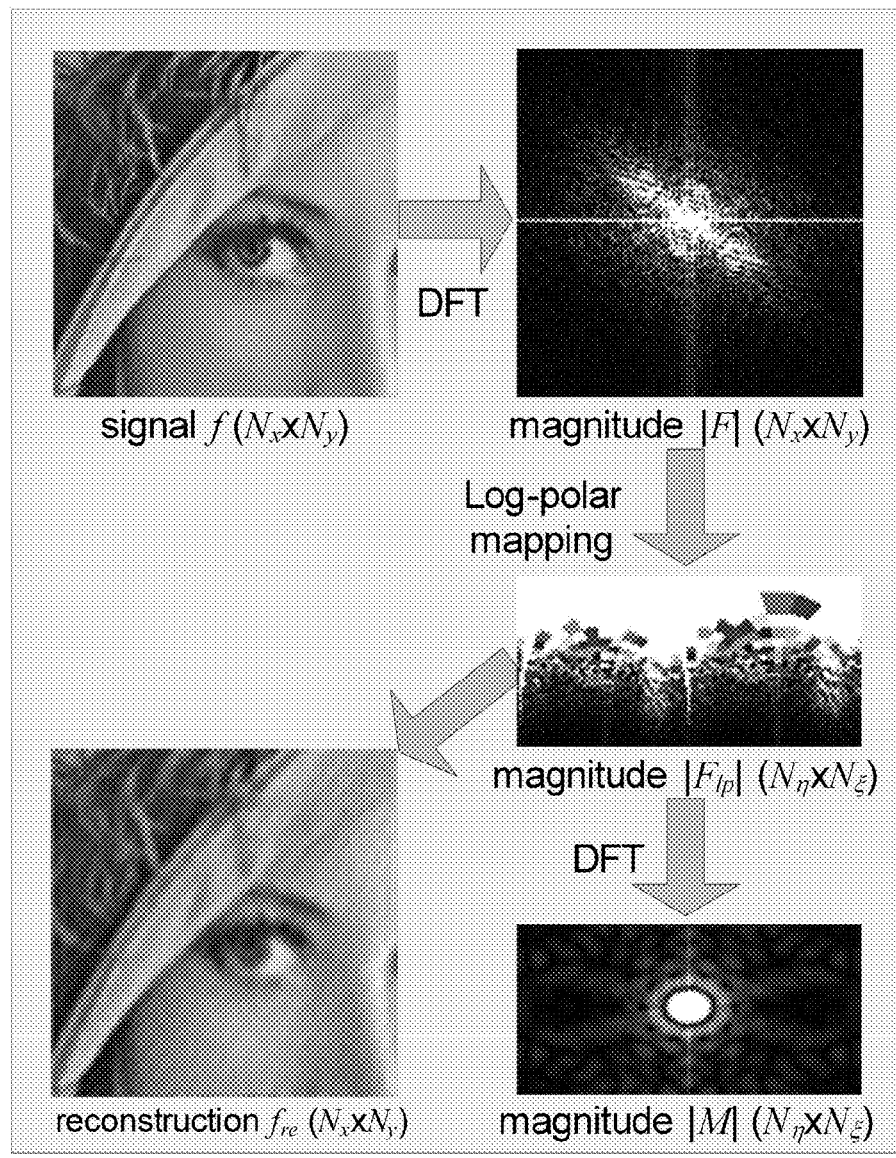
FIG. 12 illustrates a processing flow of an FMT.

FIG. 12 shows a processing flow of FMT, where FMT M of $N_\eta \times N_\xi$ is acquired from an image signal, f, of $N_x \times N_y$. Reconstruction $f_{re}$ is calculated from $F_{lp}$, that is DFT in the log-polar space. FIG. 12 shows a case when the model reconstruction $f_{m\_re}$ is calculated from the central part of the image I.

A model FMT $M_m$ is acquired from the central part of the image I.

The eccentricity $\theta_\epsilon$ is estimated from translation calculated between M and $M_m$ using Equ. (3).

C. Estimation

The resolution of image DF is not uniform but it changes radial-symmetrically around the optical axis. That is, it does not change in the tangential direction in case of the same incident angle θ, but it changes only in the radial direction. When the $\theta_\epsilon$ changes, the resolution of the image UDF gives the following properties:

1) The resolution changes largely versus the $\theta_\epsilon$ (i.e., the resolution gets much lower than the case of $\theta_\epsilon=0$, as the $\theta_\epsilon$ gets larger).

2) The resolution is space-variant, i.e., the resolution is not uniform in the whole of image. Also, it is radial-asymmetrical around the image center of the image UDF that corresponds to the target image center, if the $\theta_\epsilon$ exists.

FMT of the image UDF is estimated using root mean square error (RMSE) between the reconstruction $f_{re}$ and the model reconstruction $f_{m\_re}$ by the same size of $N_x \times N_y$. The RMSE E is denoted as $$E = \sqrt{\dfrac{\|f_{re} - f_{m\_re}\|^2}{N_x \cdot N_y}}. \qquad (27)$$

Figure 13:
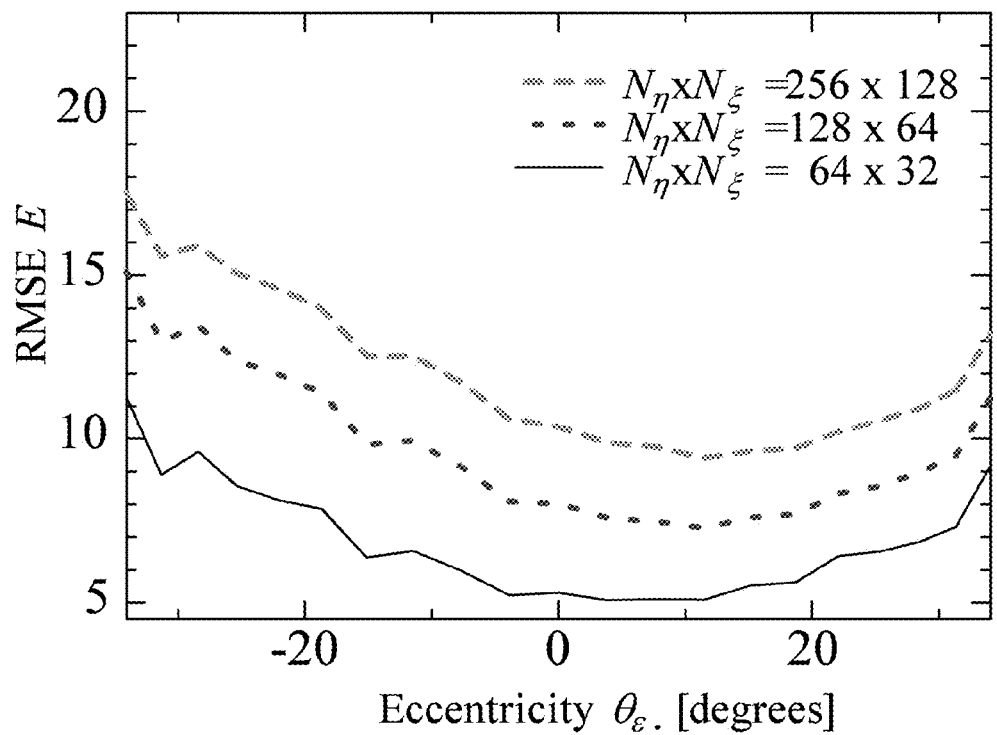
FIG. 13 illustrates an RMSE between the reconstructions $f_{re}$ and $f_{m\_re}$ under conditions of $N_\eta \times N_\xi$=256×128, 128×64 and 64×32.

FIG. 13 shows the RMSE versus the eccentricity $\theta_\epsilon$ (when $\phi_d=0$) in three cases of $N_\eta \times N_\xi=256\times128$, $128\times64$, and $64\times32$. The RMSE is calculated by an average of 100 repetitions. In this simulation, the image DF is calculated in condition of $r_{max}=36$[pixel], $\theta_{max}=60.0[°]$, $\theta_0=9.826[°]$, $\theta_1=19.107[°]$ and $\theta_2=34.715[°]$. The image UDF is mapped from the image DF in condition of $r_{max}=128$[pixel] when $N_x=N_y=128$. The RMSE of all three cases increases as the $|\theta_\epsilon|$ gets larger. This is caused by the property of 1), that is, because intensity of more pixels in the image is determined from lower-resolution part. Under a condition of the eccentricity within 34.08[°], the RMSE changes by up to 3.17[%], up to 3.07[%] and up to 2.43[%] in the three cases, respectively. In addition to that, the RMSE is not zero (4.07[%], 3.14[%] and 2.08[%], respectively), even if $\theta_\epsilon=0$ (that is, by the property of 2)). The RMSE, in the case of $N_\eta \times N_\xi=64\times32$, is the smallest. This means FMT with small space of the $N_\eta \times N_\xi$ works as a low-pass filter. In other words, this case gives feature that is the robust but less detailed.

IV. Applying UFO for Eccentricity Estimation (EE):

Unreliable Feature Omission (UFO) is applied for local noise reduction of alias in the image UDF. This case applies UFO as follows:

If points in the image, corresponding to each wavelet coefficient $\omega_{j\;k,i}^{\;c}$, fulfill conditions X^Y, X and Y in each case of c=d, h and v, respectively, discard the coefficient (set it as zero) to determine a matrix v of wavelet coefficients and an image U by Inverse Discrete Wavelet Transform (IDWT) of the v is defined.

$$\begin{aligned} X &: \Delta x\left(\dfrac{k \cdot N_x}{2^{j-1}} + m, \dfrac{l \cdot N_y}{2^{j-1}} + n\right) > \dfrac{4N_x \cdot M_f}{2^{j-1}} \\ Y &: \Delta y\left(\dfrac{k \cdot N_x}{2^{j-1}} + m, \dfrac{l \cdot N_y}{2^{j-1}} + n\right) > \dfrac{4N_y \cdot M_f}{2^{j-1}}, \end{aligned} \qquad (28)$$

where Δx(x, y) and Δy(x, y) are digitized errors of the image UDF, calculated from Δθ and Δφ, that is, digitized errors determined from the image DF by Equ. (29), $M_f$ is a parameter regulating accuracy of the digitized error in sub-pixel order. The m and n are integers determined by the resolution level j.

$$\begin{cases} \Delta x = \left|\dfrac{\partial x}{\partial \theta}\right| \cdot \Delta\theta + \left|\dfrac{\partial x}{\partial \phi}\right| \cdot \Delta\phi \\ \Delta y = \left|\dfrac{\partial y}{\partial \theta}\right| \cdot \Delta\theta + \left|\dfrac{\partial y}{\partial \phi}\right| \cdot \Delta\phi. \end{cases} \qquad (29)$$

Figure 14:
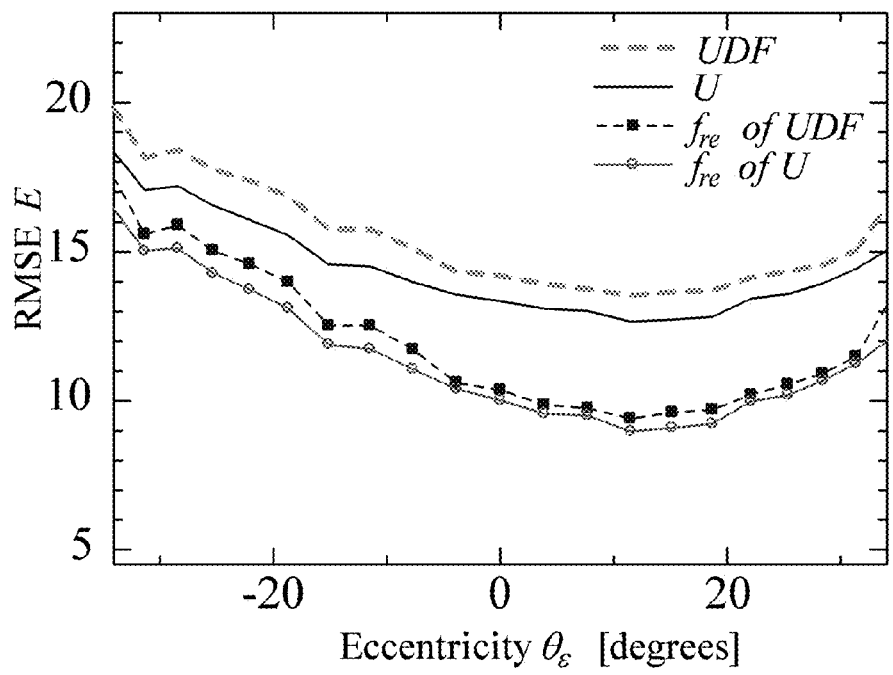
FIG. 14 illustrates an RMSE of UDF, U, $f_{re}$ of UDF and $f_{re}$ of U, from $f_{m\_re}$.
Figure 14:
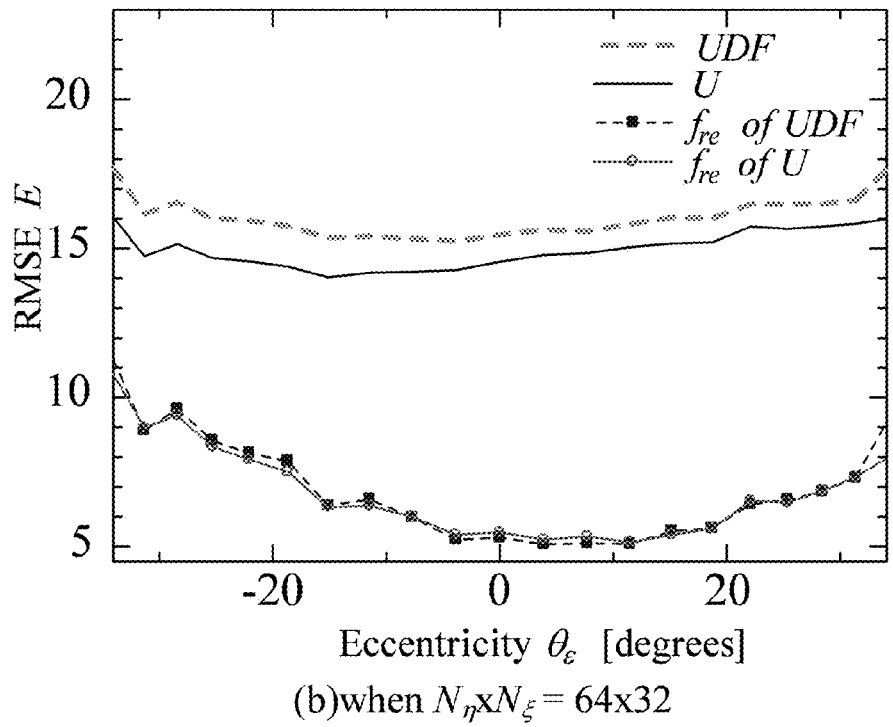

FIG. 14 shows the RMSE versus the $\theta_\epsilon$ (when $\phi_\epsilon=0$), of the image UDF (a broken line), the image U (a solid line), the reconstruction $f_{re}$ of the image UDF (a broken line with square) and the reconstruction $f_{re}$ of the image U (a solid line with circle). The RMSE is an average of 100 repetitions. The images DF uses the condition of $r_{max}=36$[pixel], $\theta_{max}=60.0$ [°], $\theta_0=9.826$ [°], $\theta_1=19.107$[°] and $\theta_2=34.715$[°]. The image UDF is mapped from the image DF in condition of $r_{max}=128$ [pixel] when $N_x=N_y=128$. UFO uses Daubechies (7, 9) biorthogonal wavelet in conditions of $N_x=N_y=128$, and $M_f=1.0$. With respect to FMT, two cases of $N_\eta \times N_\xi=256\times128$ and $N_\eta \times N_\xi=64\times32$ are compared in FIGS. 14(a) and (b). Note the following:

1) The RMSE of the U is always smaller than that of the image UDF. This means that UFO works well as an anti-alias filter that reduces local noise from the radial-asymmetric space-variant image, basically (comparing FIGS. 14(a) and (b), watermark-like alias is reduced). The RMSE is reduced by up to 0.58[%] and up to 0.65[%], in the cases of $N_\eta \times N_\xi=256\times128$ and $N_\eta \times N_\xi=64\times32$, respectively.

2) FIG. 14(a) proves that UFO improves a performance of FMT. UFO reduces the RMSE by up to 0.47[%] in this condition. In addition, the RMSE of the $f_{re}$ of the image U changes by up to 2.93 [%]. Note that this value is smaller than 3.17 [%] before UFO. This also indicates that UFO removes alias well locally from the space-variant image (see FIGS. 15(c) and (d)).

Figure 15:
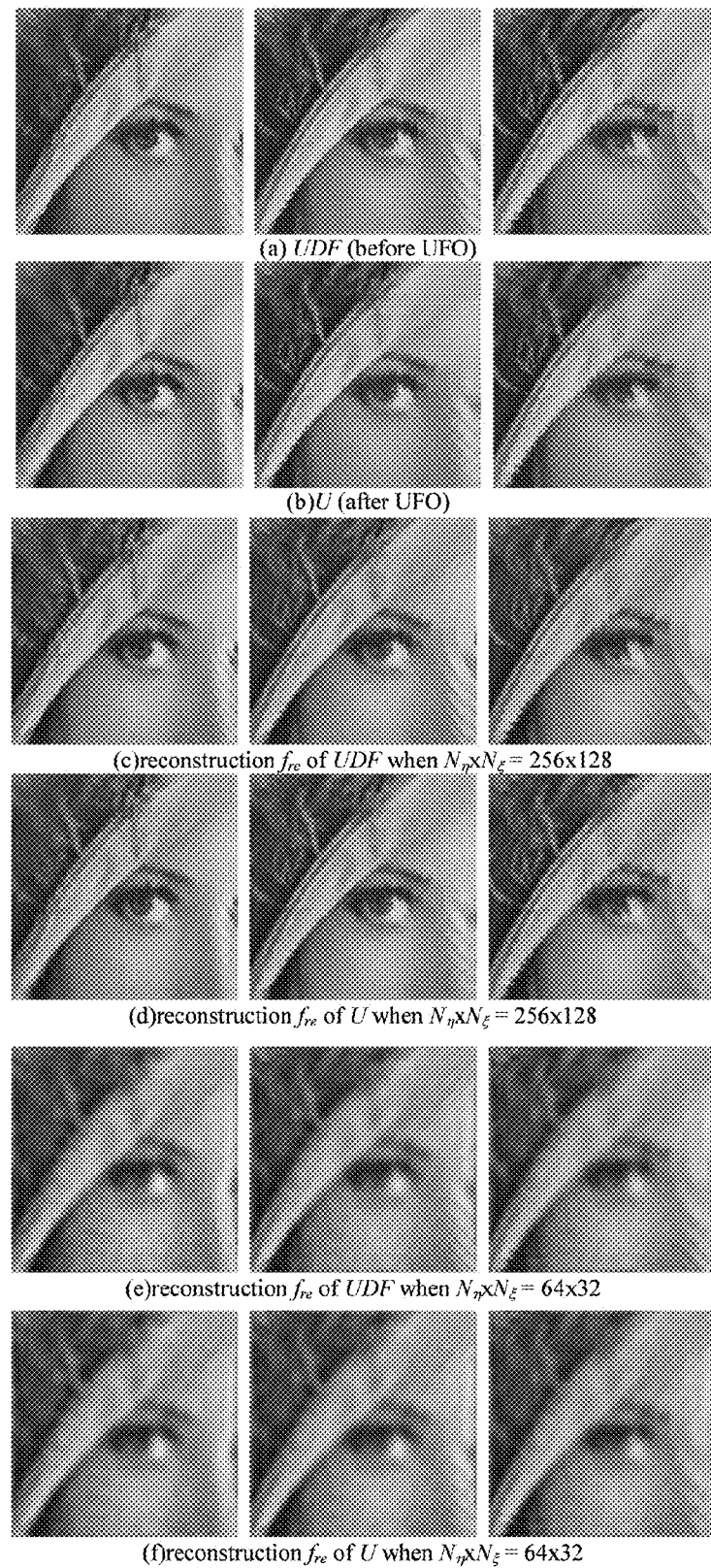
FIG. 15(a-f) illustrate UDF, U, $f_{re}$ of UDF and $f_{re}$ of U when $\theta_\epsilon$=0[°], 18.69[°], and 34.08[°] (from the left).

3) FIG. 14(b) shows UFO does not work as well when the log-polar space is too small. As shown in FIGS. 15(e) and (f), the low-pass filter effect of FMT does not only reduce aliasing but also removes high frequency components of original signal of the images UDF and U.

Inherently, FMT is robust to changing resolution, because it has a property to extract scale-invariant feature. But if the resolution is space-invariant, that is, not uniform in the whole of the image, the performance is affected. Overall, UFO works well for FMT as an anti-aliasing filter. Because UFO does not reduce the original signal more than necessary, it is more suitable for keeping the feature(s) as robust and detailed as possible, compared to a global low-pass filter that impacts the entire image, for example, by making the log-polar space of FMT be smaller.

Figure 16:
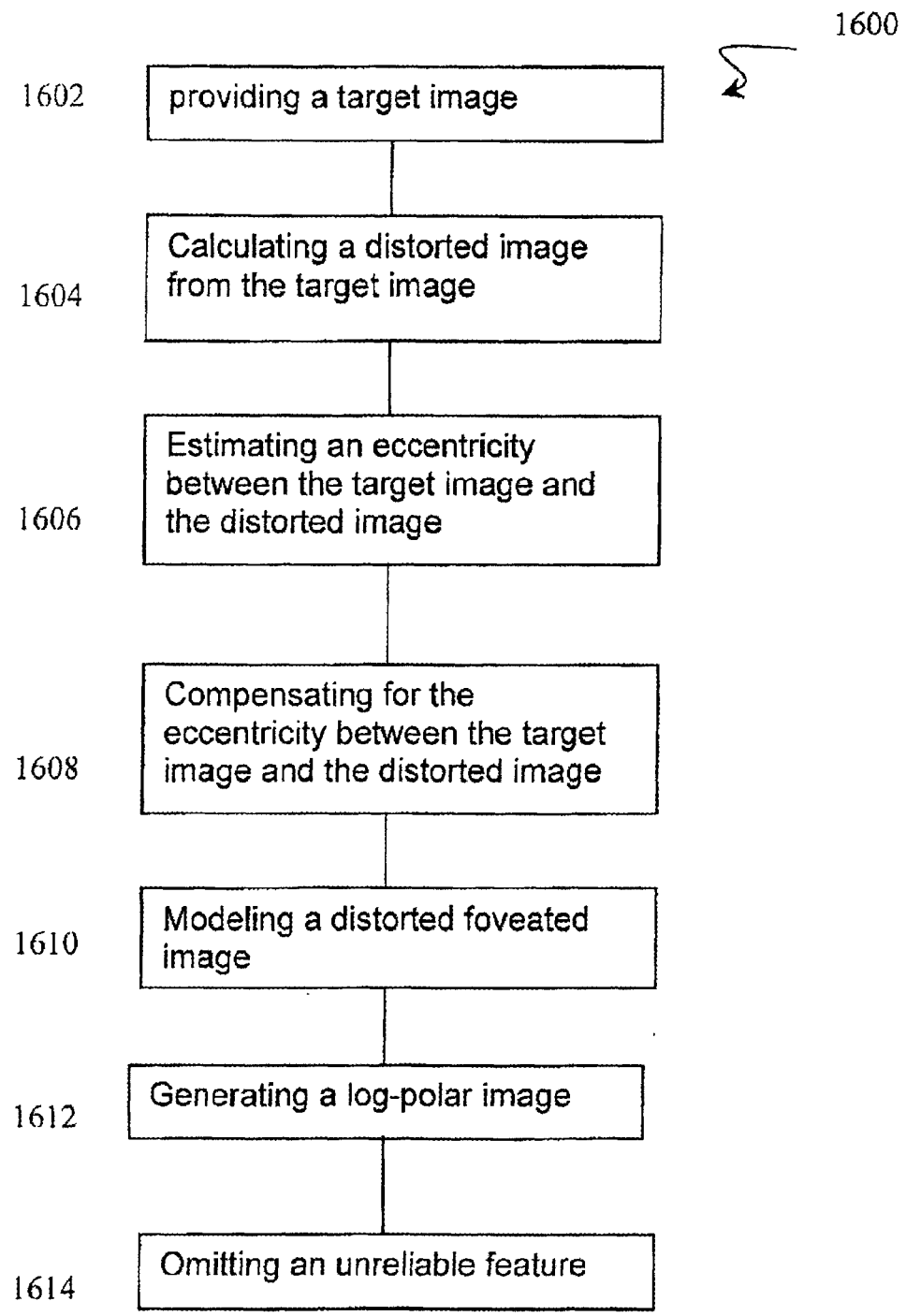
FIG. 16 illustrates a flowchart of a method of the present disclosure.

FIG. 16 illustrates a flowchart of a method 1600 of the present disclosure. The method 1600 could include providing a target image (block 1602), calculating a distorted image from the target image (block 1604), estimating an eccentricity between the target image and the distorted image (block 1606), compensating for the eccentricity between the target image and the distorted image (block 1608), modeling a distorted foveated image (block 1610), generating a log-polar image (block 1612), and omitting an unreliable feature (block 1614).

In the method 1600, the modeling the distorted foveated image may include sectoring a field of view in a plurality of areas. The plurality of the areas may at least be a foveal area, a para-foveal area, a near-peripheral area, and a peripheral area.

In the method 1600, the generating the log-polar image could include calculating at least one discrete coordinate. Further, the generating the log-polar image may include calculating at least one Cartesian coordinate. Still further, the compensating for the eccentricity may include performing a mapping.

In the method 1600, the performing the mapping could include at least one mapping selected from the group made of image to distorted foveated image and distorted foveated image to compensated log-polar image. Further, the at least one mapping of distorted foveated image to compensated log-polar image could include estimating a root mean square error. Still further, the omitting the unreliable feature may include generating a discrete wavelet transform, the omitting the unreliable feature could also include generating a threshold based on at least one quantity selected from the group made of a parameter regulating an accuracy of a digitized error, and an integer representing a resolution level.

Additionally, the omitting the unreliable feature may include generating an inverse discrete wavelet transform, and the omitting the unreliable feature may also include applying a Fourier-Mellin transform.

The foregoing method 1600 or elements of the method 1600 could also be stored on a computer-readable medium having computer-executable instructions to implement the method 1600 or the elements of the method 1600.

As a person having ordinary skill in the art would appreciate, the elements or blocks of the methods described above could take place at the same time or in an order different from the described order.

Figure 17:
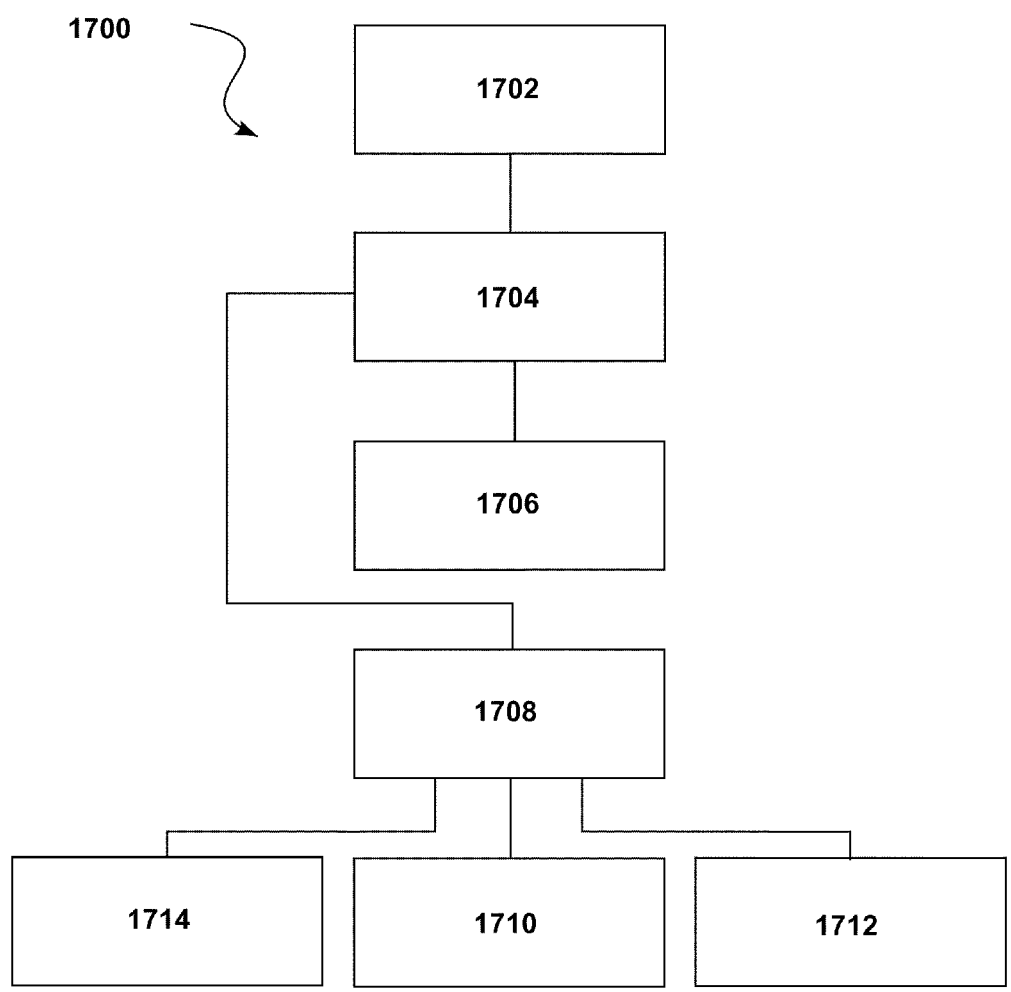
FIG. 17 illustrates a block diagram of an exemplary embodiment of a system of the present disclosure.

FIG. 17 illustrates a block diagram of an exemplary embodiment of a system 1700 of the present disclosure. The system 1700 may include a target image processing element 1702, a distorted image calculating element 1704 coupled to the target image processing element 1702, an eccentricity estimator 1706 coupled to the distorted image calculating element 1704, an eccentricity compensator 1708 coupled to the distorted image calculating element 1704, a distorted foveated image modeler 1710 coupled to the eccentricity compensator 1708, a log-polar image generator 1712 coupled to the eccentricity compensator 1708, and an unreliable feature omitter 1714 coupled to the eccentricity compensator 1708.

In the system 1700, the distorted foveated image modeler 1710 may be configured to sector a field of view in a plurality of areas. Such plurality of areas may be selected from: a foveal area, a para-foveal area, a near-peripheral area, and a peripheral area. Further, in the system 1700, the log-polar image generator 1712 may be configured to calculate at least one discrete coordinate. Further, the log-polar image generator 1712 could be configured to calculate at least one Cartesian coordinate. Further, as pertaining to the log-polar image generator 1712, the eccentricity compensator 1708 may be configured to perform a mapping. Such mapping may include at least one mapping selected from: image to distorted foveated image and distorted foveated image to compensated log-polar image. Further, the at least one mapping of distorted foveated image to compensated log-polar image could include a root mean square error estimation.

The unreliable feature omitter 1714 may be configured to generate a discrete wavelet transform. The unreliable feature omitter 1714 may be configured to generate a threshold based on at least one quantity selected from: a parameter regulating an accuracy of a digitized error, and an integer representing a resolution level.

The unreliable feature omitter 1714 could be configured to generate an inverse discrete wavelet transform. The unreliable feature omitter 1714 could be configured to apply a Fourier-Mellin transform.

As used in this specification and appended claims, the singular forms "a," "an," and "the" include plural referents unless the specification clearly indicates otherwise. The term "plurality" includes two or more referents unless the specification clearly indicates otherwise. Further, unless described otherwise, all technical and scientific terms used herein have meanings commonly understood by a person having ordinary skill in the art to which the disclosure pertains.

It should be emphasized that the above-described embodiments are merely some possible examples of implementation, set forth for a clear understanding of the principles of the disclosure. Many variations and modifications may be made to the above-described embodiments of the invention without departing substantially from the principles of the invention. All such modifications and variations are intended to be included herein within the scope of this disclosure and the present invention and protected by the following claims.

What is claimed is:

1. A method of processing an image, the method comprising:
   providing a target image in Cartesian coordinates;
   generating a mapped target image by mapping the target image to foveation coordinates according a foveation model;
   generating a foveated image by processing pixel values of the mapped target image;
   generating a mapped foveated image by mapping the foveated image to compensated-log-polar coordinates; and
   generating a compensated log-polar image by processing pixel values of the mapped foveated image;
   wherein
   the origin of the Cartesian coordinates is mapped to the origin of the foveation coordinates;
   the center of the target image is $\epsilon$ units away from the origin of the Cartesian coordinates; and
   the processing of the pixel values of the mapped target image and the processing of the pixel values of the mapped foveated image reduce distortion attributed to $\epsilon$.

2. The method of claim 1, wherein the generating of the mapped target image comprises sectoring a field of view in a plurality of areas.

3. The method of claim 2, wherein the sectoring the field of view in the plurality of areas further comprises sectoring the field of view at least in an area selected from the group comprising:
   a foveal area,
   a para-foveal area,
   a near-peripheral area, and
   a peripheral area.

4. The method of claim 1, wherein the generating of the mapped foveated image includes calculating at least one discrete coordinate.

5. The method of claim 1 further comprising omitting an unreliable feature.

6. The method of claim 1, wherein the generating of the mapped foveated image by mapping the foveated image to compensated-log-polar coordinates comprises estimating a root mean square error.

7. The method of claim 5, wherein the omitting of the unreliable feature comprises generating a discrete wavelet transform.

8. The method of claim 5, wherein the omitting of the unreliable feature includes generating a threshold based on at least one quantity selected from the group comprising:
   a parameter regulating an accuracy of a digitized error, and
   an integer representing a resolution level.

9. The method of claim 5, wherein the omitting of the unreliable feature comprises generating an inverse discrete wavelet transform.

10. The method of claim 5, wherein the omitting of the unreliable feature comprises applying a Fourier-Mellin transform.

11. A system for processing an image, comprising:
    a target image processing element configured to process a target image in Cartesian coordinates;
    a mapped target image generating element configured to generate a mapped target image by mapping the target image to foveation coordinates according a foveation model, coupled to the target image processing element;
    a foveated image generating element configured to process pixel values of the mapped target image, coupled to the mapped target image generating element;
    a mapped foveated image generating element configured to map the foveated image to compensated-log-polar coordinates, coupled to the foveated image generating element; and
    a compensated log-polar image generating element configured to process pixel values of the mapped foveated image, coupled to the mapped foveated image generating element;
    wherein:
    the origin of the Cartesian coordinates is mapped to the origin of the foveation coordinates;
    the center of the target image is $\epsilon$ units away from the origin of the Cartesian coordinates; and
    the processing of the pixel values of the mapped target image and the processing of the pixel values of the mapped foveated image reduce distortion attributed to $\epsilon$.

12. The system of claim 11, wherein the mapped target image generating element is configured to sector a field of view in a plurality of areas.

13. The system of claim 12, wherein one of the plurality of areas is selected from the group comprising:
    a foveal area,
    a para-foveal area,
    a near-peripheral area, and
    a peripheral area.

14. The system of claim 11, wherein the mapped foveated image generating element is configured to calculate at least one discrete coordinate.

15. The system of claim 11, further comprising an unreliable feature omitter coupled to the compensated log-polar image generating element.

16. The system of claim 11, wherein the mapped foveated image generating element is further configured to estimate a root mean square error estimation.

17. The system of claim 15, wherein the unreliable feature omitter is configured to generate a discrete wavelet transform.

18. The system of claim 15, wherein the unreliable feature omitter is configured to generate a threshold based on at least one quantity selected from the group consisting of:
    a parameter regulating an accuracy of a digitized error, and
    an integer representing a resolution level.

19. The system of claim 15, wherein the unreliable feature omitter is configured to generate an inverse discrete wavelet transform.

20. The system of claim 15, wherein the unreliable feature omitter is configured to apply a Fourier-Mellin transform.

21. A non-transitory computer-readable medium having computer-executable instructions for:
    providing a target image in Cartesian coordinates
    generating a mapped target image by mapping the target image to foveation coordinates according a foveation model;
    generating a foveated image by processing pixel values of the mapped target image;
    generating a mapped foveated image by mapping the foveated image to compensated-log-polar coordinates; and
    generating a compensated log-polar image by processing pixel values of the mapped foveated image;
    wherein
    the origin of the Cartesian coordinates is mapped to the origin of the foveation coordinates;
    the center of the target image is $\epsilon$ units away from the origin of the Cartesian coordinates; and
    the processing of the pixel values of the mapped target image and the processing of the pixel values of the mapped foveated image reduce distortion attributed to $\epsilon$.

* * * * *